United States Patent
Ramasamy et al.

(10) Patent No.: US 11,157,397 B2
(45) Date of Patent: *Oct. 26, 2021

(54) ROBOTIC PROCESS AUTOMATION SIMULATION OF ENVIRONMENT ACCESS FOR APPLICATION MIGRATION

(71) Applicant: Bank of America Corporation, Charlotte, NC (US)

(72) Inventors: Suki Ramasamy, Chennai (IN); Sasidhar Purushothaman, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/919,525

(22) Filed: Jul. 2, 2020

(65) Prior Publication Data

US 2020/0334136 A1    Oct. 22, 2020

Related U.S. Application Data

(63) Continuation of application No. 15/796,987, filed on Oct. 30, 2017, now Pat. No. 10,705,948.

(51) Int. Cl.
*G06F 11/36* (2006.01)

(52) U.S. Cl.
CPC ........ *G06F 11/3692* (2013.01); *G06F 11/366* (2013.01); *G06F 11/3624* (2013.01); *G06F 11/3644* (2013.01); *G06F 11/3668* (2013.01); *G06F 11/3688* (2013.01); *G06F 11/3628* (2013.01)

(58) Field of Classification Search
None
See application file for complete search history.

(56) References Cited

U.S. PATENT DOCUMENTS

| | | |
|---|---|---|
| 6,115,646 A | 9/2000 | Fiszman et al. |
| 6,971,096 B1 | 11/2005 | Ankireddipally et al. |
| 7,454,399 B2 | 11/2008 | Matichuk |
| 7,818,283 B1 | 10/2010 | Bajpay et al. |
| 7,882,394 B2 | 2/2011 | Hosek et al. |
| 7,973,508 B2 | 7/2011 | Le |
| 8,407,661 B2 | 3/2013 | Wang et al. |
| 8,451,809 B2 | 5/2013 | Pratt, Jr. et al. |
| 8,812,616 B2 | 8/2014 | Armerding |
| 8,890,652 B2 | 11/2014 | Falk et al. |

(Continued)

*Primary Examiner* — Qing Chen
(74) *Attorney, Agent, or Firm* — Michael A. Springs; Moore & Van Allen PLLC; Seongun M. Hong

(57) ABSTRACT

The invention utilizes a plurality of robotic process automation (RPA) bots to generate data regarding production issues within applications. The RPA bots may simulate user access to the environment (i.e. user load) to predict possible issues or failures of the application within the particular environment. The RPA bots may further be used to identify the needs of an application when migrating the application from one environment to another. To this end, the bots may perform a dynamic simulation sequence for accessing applications, which may provide a realistic simulation of user load for an application within a certain environment. In this way, bots may be used to monitor and understand the complete runtime sequence and behavior of applications that would enable administrators to select the appropriate stack of modules of the destination infrastructure.

18 Claims, 3 Drawing Sheets

(56) References Cited

U.S. PATENT DOCUMENTS

| | | |
|---|---|---|
| 8,898,620 B2 | 11/2014 | Eizenman et al. |
| 8,938,490 B2 | 1/2015 | Norris et al. |
| 9,183,106 B2 | 11/2015 | Rao et al. |
| 9,378,064 B2 | 6/2016 | Dees, Jr. et al. |
| 9,555,544 B2 | 1/2017 | Bataller et al. |
| 2005/0131708 A1 | 6/2005 | Palma et al. |
| 2007/0079291 A1 | 4/2007 | Roth |
| 2010/0281467 A1 | 11/2010 | Arteaga et al. |
| 2012/0174124 A1 | 7/2012 | Ward et al. |
| 2013/0117731 A1 | 5/2013 | LeSuer et al. |
| 2014/0223418 A1 | 8/2014 | Michelsen et al. |
| 2016/0132372 A1 | 5/2016 | Anderson et al. |
| 2017/0052824 A1 | 2/2017 | Sharma et al. |
| 2017/0220324 A1 | 8/2017 | Balasubramanian et al. |
| 2017/0249283 A1 | 8/2017 | Gupta et al. |
| 2017/0352041 A1 | 12/2017 | Ramamurthy et al. |
| 2017/0372227 A1 | 12/2017 | Hosabettu et al. |
| 2017/0373960 A1 | 12/2017 | Sachdev et al. |
| 2018/0053007 A1 | 2/2018 | Alexander et al. |
| 2018/0074931 A1 | 3/2018 | Garcia et al. |

ROBOTIC PROCESS AUTOMATION SIMULATION OF ENVIRONMENT ACCESS FOR APPLICATION MIGRATION

CROSS-REFERENCE TO RELATED APPLICATION

This application is a continuation of and claims priority from allowed, U.S. patent application Ser. No. 15/796,987 (now U.S. Pat. No. 10,705,948), filed on Oct. 30, 2017, and entitled "ROBOTIC PROCESS AUTOMATION SIMULATION OF ENVIRONMENT ACCESS FOR APPLICATION MIGRATION".

FIELD OF THE INVENTION

The present invention embraces a system, computer program product, and computer-implemented method for utilizing robotic process automation for application testing and migration of applications between various environments.

BACKGROUND

In the hardware and software context, current systems pose a number of technological challenges when migrating applications from one environment to another. For instance, the application code contain latent bugs that are not easily detected in the non-production environment. Furthermore, it may be difficult to determine which stack of modules should be deployed in the production environment to maximize stability and performance. Accordingly, there is a need for a way to predict and verify issues within the application as well as reliably determine the right stack of modules to optimize computing efficiency.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The invention utilizes a plurality of robotic process automation (RPA) bots to generate data regarding production issues within applications. The RPA bots may simulate user access to the environment (i.e. user load) to predict possible issues or failures of the application within the particular environment. The RPA bots may further be used to identify the needs of an application when migrating the application from one environment to another. To this end, the bots may perform a dynamic simulation sequence for accessing applications, which may provide a realistic simulation of user load for an application within a certain environment. In this way, bots may be used to monitor and understand the complete runtime sequence and behavior of applications that would enable administrators to select the appropriate stack of modules of the destination infrastructure.

Accordingly, embodiments of the present invention provide a system, computer program product, and computer-implemented method for utilizing robotic process automation for application testing and migration of applications between various environments. The invention comprises configuring a first access RPA bot to execute a first set of actions within a testing application; accessing, via the first access RPA bot, the testing application over a network; executing, via the first access RPA bot, the first set of actions within the testing application; detecting a first error within the testing application, wherein the first error is caused at least in part by the first access RPA bot executing the first set of actions within the testing application; retrieving, via a monitor RPA bot, instantaneous performance data of the testing application at a time of the first error; and storing, within an RPA database, an event entry associated with the first error, wherein the event entry associated with the first error comprises the first set of actions and the instantaneous performance data at the time of the first error.

In some embodiments, the invention further comprises configuring a second access RPA bot to execute a second set of actions within the testing application; accessing, via the second access RPA bot, the testing application over a network; executing, via the second access RPA bot, the second set of actions within the testing application; detecting a second error within the testing application, wherein the second error is caused at least in part by the second access RPA bot executing the second set of actions within the testing application; retrieving, via the monitor RPA bot, instantaneous performance data of the testing application at a time of the second error; and storing, within the RPA database, an event entry associated with the second error, wherein the event entry associated with the second error comprises the second set of actions and the instantaneous performance data at the time of the second error.

In some embodiments, the invention further comprises configuring the first set of actions according to a first profile.

In some embodiments, the invention further comprises configuring the second set of actions according to a second profile.

In some embodiments, the invention further comprises sending an alert to a user, wherein the alert comprises the instantaneous performance data at the time of the first error and the first set of actions.

In some embodiments, the invention further comprises executing a remediation sequence using the first access RPA bot.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
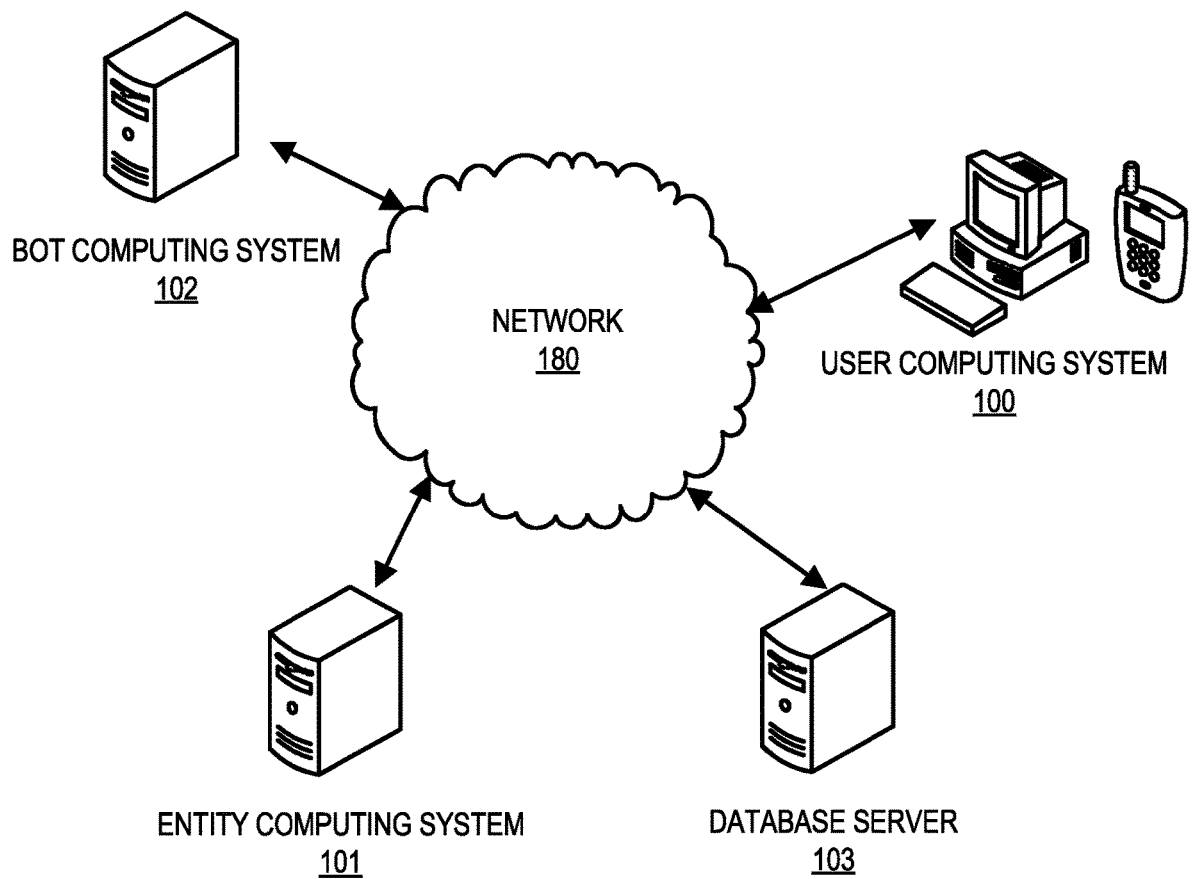
Figure 2:
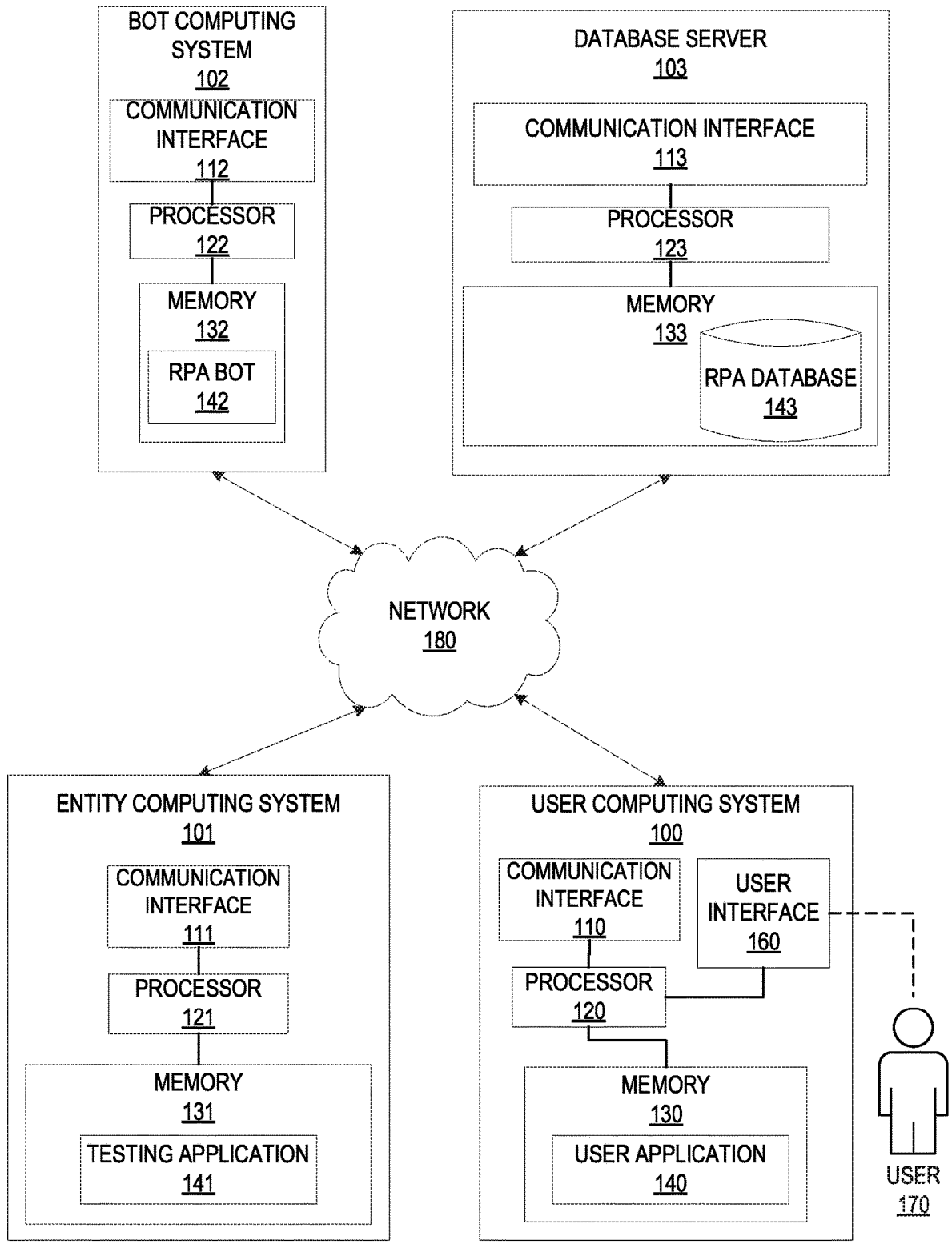
Figure 3:
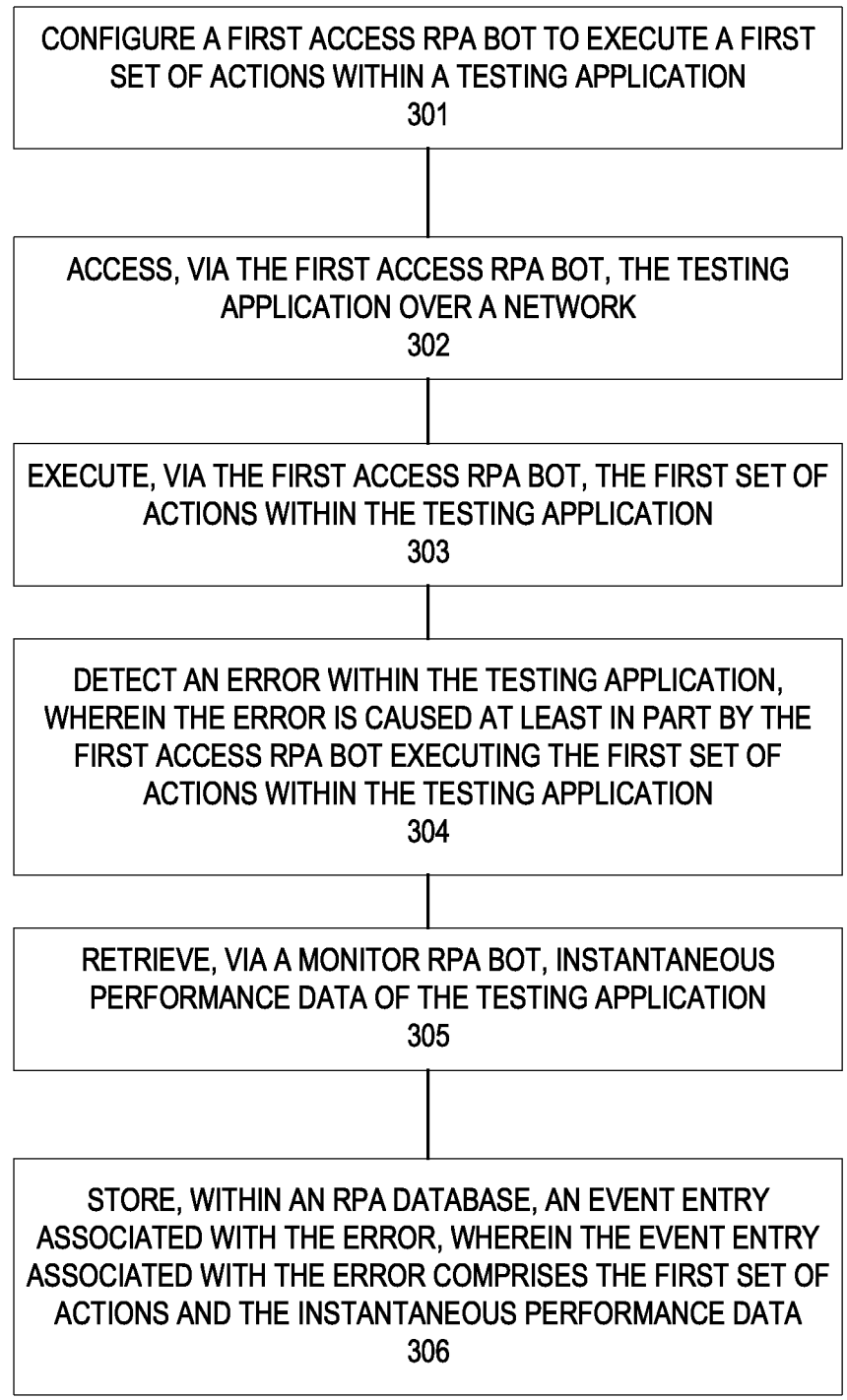

Having thus described embodiments of the invention in general terms, reference will now be made to the accompanying drawings, wherein:

FIG. 1 depicts an operating environment, in accordance with one embodiment of the present invention;

FIG. 2 depicts a schematic of an entity computing system, a bot computing system, a database server, and a user computing system, in accordance with one embodiment of the present invention; and FIG. 3 depicts a process flow illustrating the use of RPA bots for testing applications in an environment, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Robotic process automation" or "RPA" as used herein may refer to the automation of high-volume processes using bots.

"Bot" as used herein may refer to a software application that performs automated tasks. In particular, a plurality of bots may be used by an entity to perform various functions for high-volume applications that relate to the entity's objectives. Typically, a bot will be configured to repeatedly perform a specific task. Each bot may be configured to utilize particular protocols and be compatible with particular platforms and applications. In some embodiments, a bot may be configured to execute its tasks by interacting with other applications within the entity's systems at the interface level (i.e. by providing inputs to the interfaces of the other applications).

"Entity" as used herein may refer to an individual or an organization that owns and/or operates a system of networked computing devices and/or systems on which a plurality of bots are implemented. The entity may be a business organization, a non-profit organization, a government organization, and the like.

"User" as used herein may refer to an individual who may log onto the system to view and/or manage the functioning of the RPA bots. Typically, the user is authorized by the entity to access the system. Accordingly, in some embodiments, the user may be an employee of the entity such as an administrator. In other embodiments, "user" may refer to an individual who may log onto the system to access the testing application.

"Computing system" as used herein may refer to a networked computing device within the entity system. The computing system may include a processor, a non-transitory storage medium, a communications device, and a display. The computing system may support user logins and inputs from any combination of similar or disparate devices. Accordingly, the computing system may be a portable electronic device such as a smartphone, tablet, or laptop, or the computing may be a stationary unit such as a personal desktop computer or networked terminal within an entity's premises. In some embodiments, the computing system may be a local or remote server which is configured to send and/or receive inputs from other computing systems on the network.

Embodiments of the present invention provide a system, computer program product, and method for utilizing robotic process automation bots for migration of applications across environments. Typically, an entity utilizes a plurality of RPA bots to interact with applications at the interface level to predict and identify potential issues or failure points of the applications within the particular environment. In some embodiments, access RPA bots may be configured to execute a particular access sequence for a given application in a given environment. In other words, the RPA bots are able to access applications in real-time in order to realistically simulate user load for testing purposes. Typically, the RPA bots are configured to be able to perform a highly detailed sequence of actions intended to simulate the most nuanced actions and behaviors of the user while accessing the application. For instance, the RPA bot may be configured to provide user inputs in a way that a user would, such as by operating a mouse or keyboard using human-like movements and timings. The RPA bot may further be configured to interact with and respond to outputs provided by the application as a user would. For example, the RPA bot may interact with dialogue boxes or error message produced by an application as a user would. The access RPA bots may further be utilized to mimic how applications work within a current infrastructure to identify the needs for the application when migrating the applications to a different environment. In this way, by gathering data on applications within a source environment under an accurately simulated user load, the entity is able to select the correct stack of modules to deploy in the destination environment.

In addition to the RPA bots which simulate user load, the system may further utilize a number of RPA bots which monitor the applications and capture the data relating to production issues. For instance, a monitor RPA bot may keep track of the actions performed by each access RPA bot within the application as well as application events. The monitor RPA bot may also track the performance, capacity, rate of utilization, usage of the application, and the like in order to ascertain migration requirements when transitioning an application from one environment to another, such as from a non-cloud to a cloud environment. The monitor RPA bot may further track the exact sequence of events and actions that creates a failure within the application. The monitor RPA bot may then pass this information to a remediation RPA bot, which may in turn execute one or more actions to remediate the failure, such as by restarting the application, loading additional modules into the memory, unloading problematic modules, and the like. The monitor RPA bot may additionally provide the failure data to a reporting RPA bot, which may be configured to send a report of the failure. The reporting RPA bot may, for instance, log the instance and circumstances of the failure to a log within an error database, and/or send a report of the failure to an individual within the entity, such as an administrator.

Utilizing RPA bots in this way to identify application failures as well as migration requirements addresses a number of computer technology-centric challenges. By utilizing RPA bots to simulate user load, the system is able to perform stress testing on demand and in a scalable manner, whereas testing via conventional methods are subject to the availability and size of the selected testing group. Furthermore, testing applications in this manner eliminates many of the inefficiencies inherent in coordinating the computing systems of a large group of test users. For instance, rather than utilizing a great number of separate computing systems for testing (e.g. one computing system per user), it is possible to run the RPA bot processes to simulate a plurality of users per computing system. This in turn reduces the demands on computer resources associated with the testing process, such as processing power, memory space, storage space, cache space, electric power, and networking bandwidth.

FIG. 1 is a block diagram illustrating an operating environment 001 for the RPA bot system, in accordance with one embodiment of the present invention. The operating environment may include a user computing system 100 in operative communication with an entity computing system 101, a bot computing system 102, and a database server 103 over a network 180. The network 180 may also be a global area network (GAN), such as the Internet, a wide area network (WAN), a local area network (LAN), or any other type of network or combination of networks. The network 180 may provide for wireline, wireless, or a combination wireline and wireless communication between devices on the network 180. The user computing system 100 is a device that may be operated by a user, where the device may be a mobile device such as a smartphone, tablet, or laptop, a personal computing device such as a desktop computer, smart device, single board computer, or a device owned and operated by an entity, such as a computer system terminal located on the entity's premises. In some embodiments, the user is an employee of the entity such as an administrator of the RPA bot system who is authorized to access the entity computing system 101, the bot computing system 102, and/or the database server 103.

Typically, the entity computing system 101 stores and runs the target application to be tested and/or migrated to another environment. The entity computing system 101 may be configured to, at certain times, be accessible by members of the public, such as clients of the entity. In some embodiments, public access to the entity computing system 101 may be restricted when testing via access RPA bots is being conducted. Public access to the entity computing system 101 may be restored once testing is complete and the application goes "live." The bot computing system 102 may store and run the various RPA bots used for error testing and migration purposes. The RPA bots stored on the bot computing system 102 may include the access RPA bots, the monitor RPA bots, the reporting RPA bots, and the remediation RPA bots. The database server 103 may comprise a database of actions taken by the RPA bots as well as events reported by the application. The bot computing system 102 may be configured to store actions and events to the database within the database server 103. In some embodiments, the bot computing system 102 may be configured to continuously store usage data regarding the application. In other embodiments, the bot computing system 102 may be configured to store usage data only when testing is being carried out.

It should be understood by those having ordinary skill in the art that although the entity computing system 101 and the bot computing system 102 as depicted are depicted as single computing systems, both the entity computing system 101 and the bot computing system 102 may represent multiple computing systems which, in some embodiments, may be operating in a distributed fashion. Accordingly, it should be further understood that the database server 103 may exist on a single server or on multiple servers in a distributed configuration. In other embodiments, the rules database may be stored on a system separate from the entity computing system 101, such as on a database server 103. In such an embodiment, the database server 103 may comprise the rules database which contains the execution data from which the bot computing system 102 obtains its commands. The database server 103 may further comprise an operations database, from which the RPA bot pulls the operations data it requires to fulfill its tasks.

Typically, user computing systems 100 are used to log onto the entity computing system 101 over the network 180 to access the RPA bot 142 on the bot computing system 102 or the RPA database 143 on the database server 103 to manage the functions of the various RPA bots and/or access the testing data within the RPA database 143. The user computing system 100 may further allow the user 170 to access and/or configure the testing application 141 based on the testing data. The entity computing system 101, the bot computing system 102, and/or the database server 103 may require that authentication credentials are provided by the user computing system 100. In some embodiments, the authentication credentials may include a username, password, a biometric identifier, a cryptographic key, a token, and the like. The system may further require that more than one authentication credential is provided as parts of a multi-step authentication process.

In some embodiments, each access RPA bot may execute its instructions according to a simulated user profile. Each user profile may represent a different type of user who may use the application stored on the entity computing system 101. For instance, there may be user profiles to represent the standard users who make up the majority of users of the application. There may additionally be user profiles that represent power users, who may utilize the application frequently or for extended periods of time, or who may utilize certain features of the application that are not commonly used by standard users. In this way, the system is able to create a plurality of access RPA bots with profiles that provide an accurate representation of the types of users and the type of user loads that can be expected of an application within the live environment.

FIG. 2 is a block diagram illustrating the user computing system 100, the entity computing system 101, the bot computing system 102, and the database server 103 in more detail, in accordance with one embodiment of the present invention. The entity computing system 101 typically contains a processor 121 communicably coupled to such devices as a communication interface 111 and a memory 131. The processor 120, and other processors described herein, typically includes circuitry for implementing communication and/or logic functions of the entity computing system 101. For example, the processor 121 may include a digital signal processor device, a microprocessor device, and various analog to digital converters, digital to analog converters, and/or other support circuits.

The entity computing system 101 may use the communication interface 111 to communicate with other devices over the network 180. The communication interface 111 as used herein may include an Ethernet interface, an antenna coupled to a transceiver configured to operate on a cellular data or WiFi signal, and/or a near field communication ("NFC") interface.

The entity computing system 101 may include a memory 131 operatively coupled to the processor 121. As used herein, memory includes any computer readable medium (as defined herein below) configured to store data, code, or other information. The memory may include volatile memory, such as volatile Random Access Memory (RAM) including a cache area for the temporary storage of data. The memory may also include non-volatile memory, which can be embedded and/or may be removable. The non-volatile memory can additionally or alternatively include an electrically erasable programmable read-only memory (EEPROM), flash memory or the like. The memory 131 within the entity computing system 101 may comprise a testing application 141, which is the application to be accessed by the access RPA bots for testing purposes. The testing application 141 may be configured to be accessible only to the RPA bots or to other computing systems depending on the stage of testing and the environment into which the testing application 141 is deployed.

The bot computing system 102 may comprise a communication interface 112, a processor 122, and a memory 132 having one or more RPA bots 142 stored thereon. Typically, the RPA bots 142 are be configured to repeatedly execute a specific task in high volume applications. In particular, the RPA bots 142 may include various types of bots used in the testing or migration of a particular application. For instance, the RPA bots 142 may include access RPA bots which access the application (typically over the network 180) and execute user commands to interact with the application. In some embodiments, the access RPA bots may execute user commands in accordance with specific user profiles stored within the memory 132. For instance, an access RPA bot configured with the "standard user" profile may access the application as an average user would, which may be defined by length or manner of use, or the utilization of certain commonly-used functions within the application. The bot computing system 102 may run a plurality of access RPA bots simultaneously according to certain user profiles in order to realistically simulate user load on the testing application 141. The RPA bots 142 may further include monitoring RPA bots which track the performance, capacity, rate of utilization, and the like of the application.

The database server 103 may also comprise a communication interface 113, a processor 123, and a memory 133 having an RPA database 143 stored thereon. It should be appreciated that the RPA database 143 may also exist as a single logical database distributed amongst a plurality of computing systems. The RPA database 143 may contain data on the actions taken by the various RPA bots within the system. For instance, the RPA database 143 may contain the actions taken by access RPA bots within the testing application 141. For instance, the access RPA bots may access the testing application 141 to execute a number of functions or utilize certain features as a user would. The RPA database 143 may further contain data regarding events within the testing application 141 occurring from the actions taken by the access RPA bots. For example, the access RPA bots may access functions within the testing application 141 in a particularized sequence, which causes a particular event, such as an error, bug, or crash within the testing application 141. The RPA database 143 may store the details of the event (e.g. the type of error or bug and the systems affected by the error or bug) as well as the circumstances of the event (e.g. the exact actions that led to the error or bug). In some embodiments, the RPA database 143 may further contain performance data of the application, such as application uptime, computing resources used, application latency, and the like, which may be stored by the monitor RPA bots. The RPA database 143 may further contain access RPA bot profile data, which contains the profiles used by the various access RPA bots when utilizing the testing application 141.

The user computing system 100 typically also includes a processor 120 operatively coupled to a communication interface 110 and a memory 130. The memory 130 may contain a user application 140 which causes the processor 120 to display a user interface 160 to a user 170. The user interface 160 may comprise the hardware and software implements necessary to accept input from and provide output to the user. Accordingly, the user interface 160 may comprise hardware such as a display, audio output devices, projectors, and the like, or input devices such as keyboards, mice, motion sensors, cameras, biometric sensors, and the like. The user interface 160 may further comprise software such as a graphical or command-line interface through which the user may provide inputs and/or receive outputs from the user computing system 100. It should be understood that the display on which the user interface 160 is presented may include an integrated display (e.g. a tablet or smartphone screen) within the user computing system 100, or an external display device (e.g. a computer monitor or television). The user application 140 within the memory 130 may be a client application to allow the user 170 to access the testing application 141, RPA bot 142, and/or the RPA database 143. In other embodiments, the application within the memory 130 may be a general purpose application such as a web browser. The application, upon receiving input from the user 170, causes the processor 120 to, through the communication interface 110, establish a communication link to the communication interface 111 of the entity computing system 101 to allow the user 170 to access and manage the RPA bot 142 and/or the RPA database 143.

The user application 140 may, by displaying a graphical interface, allow the user 170 to configure the various RPA bots within the bot computing system 102. For instance, the user 170 may specify the number of access RPA bots to run simulations on the testing application 141 as well as the profiles which the access RPA bots may use during the simulation process. The graphical interface may further allow the user 170 to specify certain actions or sequences of actions that each access RPA bot should take within the testing application 141 during the simulation process. In some embodiments, the graphical interface may further allow the user 170 to specify the various performance metrics to be tracked by the monitor RPA bots as described herein.

In some embodiments, the user application 140 may further be configured to, through the graphical interface, allow the user to access the data within the RPA database 143. By accessing the RPA database 143, the user 170 may add, modify, or delete profiles for the access RPA bots. For instance, the user 170 may be able to specify certain actions that an access RPA bot may take by changing the access rules for each profile. The user application 140 may further comprise a reporting engine which allows the user 170 to view performance data, testing events, debugging data, and the like. For example, the user 170 may be able to view the actions taken by the access RPA bots which caused an error or malfunction within the testing application 141. The user 170 may further be able to access the performance data of the application at the time of the event, such as user load, capacity, rate of utilization, and the like. The reporting engine may be configured to display the data in the graphical interface in a format desired by the user 170. For instance, the reporting engine may display the performance data in a table or in a graph of performance over time. By correlating certain performance metrics with the actions taken by the RPA bots within the testing application, the user 170 is able to gain a detailed understanding of the circumstances which may cause issues or failures within the testing application 141.

FIG. 3 is a process flow illustrating the use of RPA bots for testing applications in an environment, in accordance with one embodiment of the present invention. The process begins at block 301, where the system configures a first access RPA bot to execute a first set of actions within a testing application. Typically, access RPA bots are configured to interact with the testing application at the interface level. The access RPA bot may be configured to execute an action or a plurality of actions within the testing application in order to realistically simulate user load within the testing application. Typically, the access RPA bot will execute the actions that a user would execute within the testing application. In this way, the system is able to generate realistic testing data and reveal latent bugs or issues for the testing application within a particular environment. In some embodiments, the first access RPA bot may be configured to operate under a first profile, where the first profile corresponds to a typical user of the testing application. In such an embodiment, the first profile may cause the first access RPA bot to take actions that would be taken by a typical user of the testing application. For instance, the first access RPA bot may utilize the most commonly used functions of the testing application or utilize the testing application for a duration or intensity that is typical of an average user. In some embodiments, the system may further comprise a second access RPA bot which may be configured to operate under a second profile, where the second profile corresponds to a power user of the testing application. In such an embodiment, the second profile may cause the second access RPA bot to take actions that would be taken by a power user. For example, the second access RPA bot may utilize advanced settings or features of the application and/or utilize the testing application more frequently or intensely than the average user. By selecting the correct proportions of access RPA bots using a variety of profiles, the system is further able to realistically simulate user load within the testing application to predict potential issues.

The process continues to block 302, where the system accesses, via the first access RPA bot, the testing application over a network. Typically, the testing application is configured to accept connections from authorized users. Because the access RPA bots interact with the testing application at the interface level, the access RPA bots are treated by the testing application as users of the testing application. In some embodiments, the access RPA bots may be required to provide authentication credentials. By requiring access RPA bots to utilize the authentication functions of the testing application, the system is able to accurately simulate load on the authentication servers associated with the testing application.

The process continues to block 303, where the system executes, via the first access RPA bot, the first set of actions within the testing application. The access RPA bots may be configured to execute actions based on a particular user profile. In some embodiments, the set of actions within the testing application may be chosen to accurately simulate a user of the testing application. In some embodiments, the set of actions may be selected to create a high chance of generating an error or issue within the testing application. For instance, the set of actions may include conflicting commands or multiple access requests sent within a short period of time. In this way, the set of actions may provide a way for the system to "stress test" the testing application within the specified environment. Typically, the first set of actions is carried out by the first access RPA bot at the interface level of the testing application. In such embodiments, rather than interfacing with the testing application through a framework or API, the access RPA bots may provide inputs such as key strokes, mouse clicks, touch inputs, and the like. In this way, the access RPA bots are able to mimic the finest and most detailed user behaviors within the testing application.

The process continues to block 304, where the system detects an error within the testing application, wherein the error is caused at least in part by the first access RPA bot executing the first set of actions within the testing application. Through the access RPA bots, the system is able to pinpoint the exact circumstances in which an error or issue may arise when the testing application is deployed into the live environment. Typically, the error is caused at least in part by the sequence of actions taken by the first access RPA bot. For example, the sequence may have been configured to expose weaknesses or vulnerabilities in the code of the testing application. The error may also be caused at least in part by performance metrics such as user load, capacity, rate of utilization, and the like. In some embodiments, the access RPA bots may further be configured to send an alert to a user that an error has occurred. Typically, the user in such an embodiment is an administrator or employee of the entity. Sending an alert in this way may resolve the technical challenge of alerting an administrator of a latent error or failure that may prevent completion of the testing phase in a timely manner. Such an alert may be sent to the user application stored on the user computing system. In some embodiments, the alert may cause the user computing system to sound an audible notification in addition to providing a visual notification of the error.

The process continues to block 305, where the system retrieves, via the monitor RPA bot, instantaneous performance data of the testing application. Upon detecting that an error has occurred, the system captures various performance metrics at the instant that the error has occurred. In some embodiments, the system may continuously monitor the performance metrics at regular intervals in addition to capturing instantaneous performance metrics at the time of the error. In this way, the system is able to provide not only the performance issues which may have led to the error at the instant the error occurred, but also may provide insight into the performance issues leading up to the error which may have been contributing factors.

The process concludes at block 306, where the system stores, within an RPA database, an event entry associated with the error, wherein the event entry associated with the error comprises the first set of actions and the instantaneous performance data. Upon receiving the instantaneous performance data, the system creates a data entry correlated with the error in addition to the set of actions taken that caused the error as well as the performance data related to the error. In this way, the system is able to provide a realistic and detailed log of the circumstances in which an error may arise. The system may then take steps to resolve the error, such as by modifying the code of the testing application or providing additional computing resources, such as by providing upgraded components or additional computing systems to work in a distributed fashion. Once the errors have been resolved and the testing application meets specifications, the testing application may be migrated by the system from the testing environment to the production environment. In some embodiments, the access RPA bots may further be configured to engage a remediation sequence to clear the error, such as by restarting the application or restoring preset settings.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for utilizing robotic process automation (RPA) for application testing and migration of applications between various environments, comprising:
    a bot computing system comprising:
        a processor;
        a communication interface; and
        a memory having an RPA bot application stored therein, wherein the RPA bot application, when executed by the processor, causes the processor to:
        configure a first access RPA bot to execute a first set of actions within a testing application, wherein the first access RPA bot accesses the testing application at a user interface level, wherein the first set of actions within the testing application simulates real-time user load within a user interface of the testing application, wherein the first set of actions within the testing application comprises at least one of key strokes, mouse clicks, or touch inputs, and wherein the first set of actions within the testing application further comprises conflicting commands;
        access, via the first access RPA bot, the testing application over a network;

execute, via the first access RPA bot, the first set of actions within the testing application;
detect a first error within the testing application, wherein the first error is caused at least in part by the first access RPA bot executing the first set of actions within the testing application;
retrieve, via a monitor RPA bot, instantaneous performance data of the testing application at an instant that the first error has occurred and at regular intervals leading up to the instant that the first error has occurred, wherein the instantaneous performance data of the testing application comprises at least one of user load, user capacity, or rate of utilization; and
execute, via a remediation RPA bot, a remediation sequence to correct the first error, wherein the remediation sequence comprises at least one of loading additional modules or unloading problematic modules.

2. The system according to claim 1, wherein the RPA bot application, when executed by the processor, further causes the processor to:
configure a second access RPA bot to execute a second set of actions within the testing application;
access, via the second access RPA bot, the testing application over the network;
execute, via the second access RPA bot, the second set of actions within the testing application;
detect a second error within the testing application, wherein the second error is caused at least in part by the second access RPA bot executing the second set of actions within the testing application;
retrieve, via the monitor RPA bot, instantaneous performance data of the testing application at an instant that the second error has occurred and at regular intervals leading up to the instant that the second error has occurred;
execute, via the remediation RPA bot, a remediation sequence to correct the second error; and
store, within an RPA database, an event entry associated with the second error, wherein the event entry associated with the second error comprises the second set of actions within the testing application and the instantaneous performance data of the testing application at the instant that the second error has occurred.

3. The system according to claim 2, wherein the RPA bot application, when executed by the processor, further causes the processor to configure the second set of actions within the testing application according to a second profile.

4. The system according to claim 1, wherein the RPA bot application, when executed by the processor, further causes the processor to configure the first set of actions within the testing application according to a first profile.

5. The system according to claim 1, wherein the RPA bot application, when executed by the processor, further causes the processor to send an alert to a user, and wherein the alert comprises the instantaneous performance data of the testing application at the instant that the first error has occurred and the first set of actions within the testing application.

6. The system according to claim 1, wherein the RPA bot application, when executed by the processor, further causes the processor to store, within an RPA database, an event entry associated with the first error, wherein the event entry associated with the first error comprises the first set of actions within the testing application and the instantaneous performance data of the testing application at the instant that the first error has occurred.

7. A computer program product for utilizing robotic process automation (RPA) for application testing and migration of applications between various environments, the computer program product comprising at least one non-transitory computer-readable medium having computer-readable program code portions embodied therein, the computer-readable program code portions comprising:
a computer-readable program code portion executed to configure a first access RPA bot to execute a first set of actions within a testing application, wherein the first access RPA bot accesses the testing application at a user interface level, wherein the first set of actions within the testing application simulates real-time user load within a user interface of the testing application, wherein the first set of actions within the testing application comprises at least one of key strokes, mouse clicks, or touch inputs, and wherein the first set of actions within the testing application further comprises conflicting commands;
a computer-readable program code portion executed to access, via the first access RPA bot, the testing application over a network;
a computer-readable program code portion executed to execute, via the first access RPA bot, the first set of actions within the testing application;
a computer-readable program code portion executed to detect a first error within the testing application, wherein the first error is caused at least in part by the first access RPA bot executing the first set of actions within the testing application;
a computer-readable program code portion executed to retrieve, via a monitor RPA bot, instantaneous performance data of the testing application at an instant that the first error has occurred and at regular intervals leading up to the instant that the first error has occurred, wherein the instantaneous performance data of the testing application comprises at least one of user load, user capacity, or rate of utilization; and
a computer-readable program code portion executed to execute, via a remediation RPA bot, a remediation sequence to correct the first error, wherein the remediation sequence comprises at least one of loading additional modules or unloading problematic modules.

8. The computer program product according to claim 7, the computer-readable program code portions further comprising:
a computer-readable program code portion executed to configure a second access RPA bot to execute a second set of actions within the testing application;
a computer-readable program code portion executed to access, via the second access RPA bot, the testing application over the network;
a computer-readable program code portion executed to execute, via the second access RPA bot, the second set of actions within the testing application;
a computer-readable program code portion executed to detect a second error within the testing application, wherein the second error is caused at least in part by the second access RPA bot executing the second set of actions within the testing application;
a computer-readable program code portion executed to retrieve, via the monitor RPA bot, instantaneous performance data of the testing application at an instant that the second error has occurred and at regular intervals leading up to the instant that the second error has occurred;

a computer-readable program code portion executed to execute, via the remediation RPA bot, a remediation sequence to correct the second error; and a computer-readable program code portion executed to store, within an RPA database, an event entry associated with the second error, wherein the event entry associated with the second error comprises the second set of actions within the testing application and the instantaneous performance data of the testing application at the instant that the second error has occurred.

9. The computer program product according to claim 8, the computer-readable program code portions further comprising a computer-readable program code portion executed to configure the second set of actions within the testing application according to a second profile.

10. The computer program product according to claim 7, the computer-readable program code portions further comprising a computer-readable program code portion executed to configure the first set of actions within the testing application according to a first profile.

11. The computer program product according to claim 7, the computer-readable program code portions further comprising a computer-readable program code portion executed to send an alert to a user, wherein the alert comprises the instantaneous performance data of the testing application at the instant that the first error has occurred and the first set of actions within the testing application.

12. The computer program product according to claim 7, the computer-readable program code portions further comprising a computer-readable program code portion executed to store, within an RPA database, an event entry associated with the first error, wherein the event entry associated with the first error comprises the first set of actions within the testing application and the instantaneous performance data of the testing application at the instant that the first error has occurred.

13. A computer-implemented method for utilizing robotic process automation (RPA) for application testing and migration of applications between various environments, comprising:

configuring a first access RPA bot to execute a first set of actions within a testing application, wherein the first access RPA bot accesses the testing application at a user interface level, wherein the first set of actions within the testing application simulates real-time user load within a user interface of the testing application, wherein the first set of actions within the testing application comprises at least one of key strokes, mouse clicks, or touch inputs, and wherein the first set of actions within the testing application further comprises conflicting commands;

accessing, via the first access RPA bot, the testing application over a network;

executing, via the first access RPA bot, the first set of actions within the testing application;

detecting a first error within the testing application, wherein the first error is caused at least in part by the first access RPA bot executing the first set of actions within the testing application;

retrieving, via a monitor RPA bot, instantaneous performance data of the testing application at an instant that the first error has occurred and at regular intervals leading up to the instant that the first error has occurred, wherein the instantaneous performance data of the testing application comprises at least one of user load, user capacity, or rate of utilization; and executing, via a remediation RPA bot, a remediation sequence to correct the first error, wherein the remediation sequence comprises at least one of loading additional modules or unloading problematic modules.

14. The computer-implemented method according to claim 13, further comprising:

configuring a second access RPA bot to execute a second set of actions within the testing application;

accessing, via the second access RPA bot, the testing application over the network;

executing, via the second access RPA bot, the second set of actions within the testing application;

detecting a second error within the testing application, wherein the second error is caused at least in part by the second access RPA bot executing the second set of actions within the testing application;

retrieving, via the monitor RPA bot, instantaneous performance data of the testing application at an instant that the second error has occurred and at regular intervals leading up to the instant that the second error has occurred;

executing, via the remediation RPA bot, a remediation sequence to correct the second error; and storing, within an RPA database, an event entry associated with the second error, wherein the event entry associated with the second error comprises the second set of actions within the testing application and the instantaneous performance data of the testing application at the instant that the second error has occurred.

15. The computer-implemented method according to claim 14, further comprising configuring the second set of actions within the testing application according to a second profile.

16. The computer-implemented method according to claim 13, further comprising configuring the first set of actions within the testing application according to a first profile.

17. The computer-implemented method according to claim 13, further comprising sending an alert to a user, wherein the alert comprises the instantaneous performance data of the testing application at the instant that the first error has occurred and the first set of actions within the testing application.

18. The computer-implemented method according to claim 13, further comprising storing, within an RPA database, an event entry associated with the first error, wherein the event entry associated with the first error comprises the first set of actions within the testing application and the instantaneous performance data of the testing application at the instant that the first error has occurred.

* * * * *